UNITED STATES PATENT OFFICE.

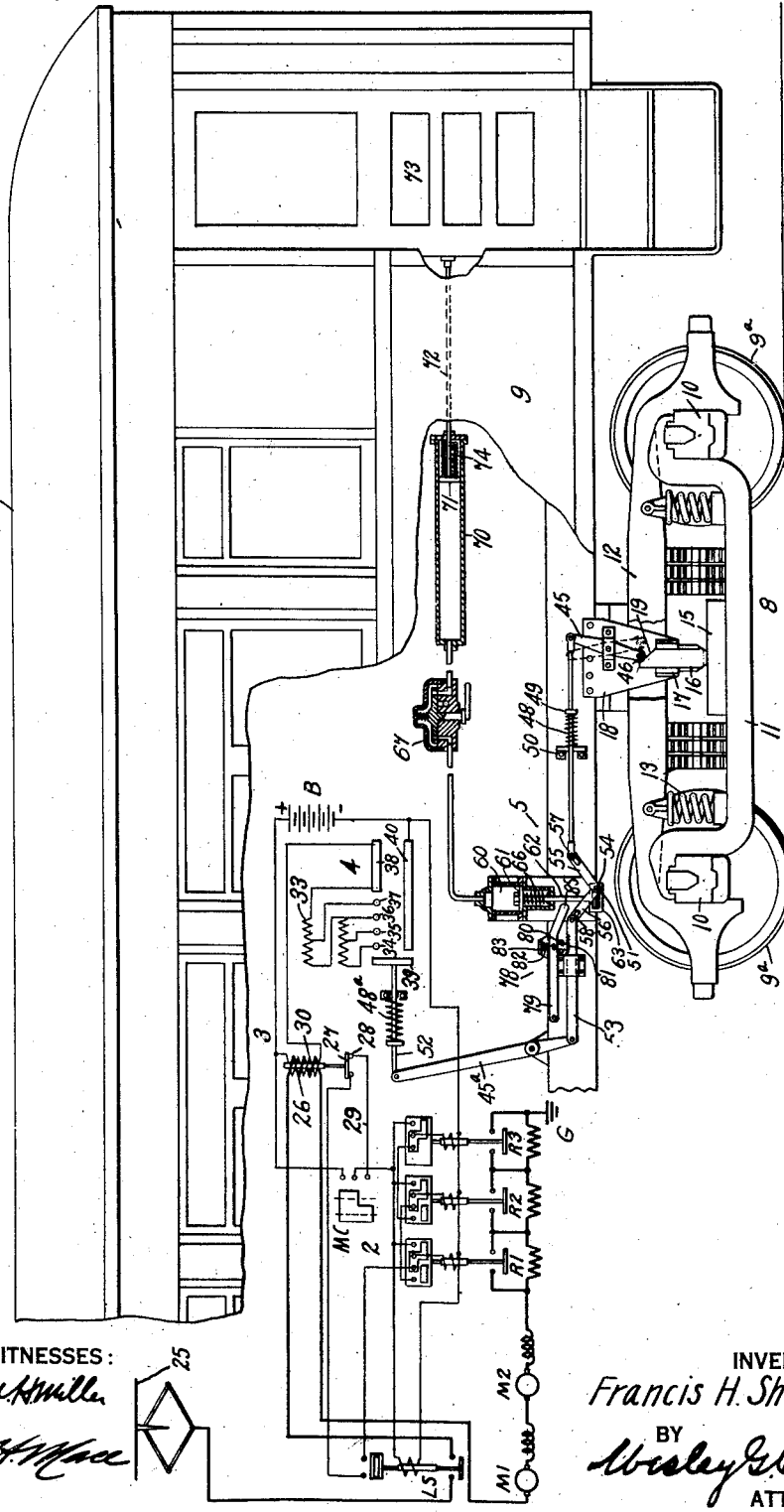

FRANCIS H. SHEPARD, OF NEW ROCHELLE, NEW YORK, ASSIGNOR TO WESTINGHOUSE ELECTRIC AND MANUFACTURING COMPANY, A CORPORATION OF PENNSYLVANIA.

CONTROL SYSTEM.

1,246,477.      Specification of Letters Patent.      Patented Nov. 13, 1917.

Application filed January 6, 1915. Serial No. 785.

*To all whom it may concern:*

Be it known that I, FRANCIS H. SHEPARD, a citizen of the United States, and a resident of New Rochelle, in the county of Westchester, and State of New York, have invented a new and useful Improvement in Control Systems, of which the following is a specification.

My invention relates to control systems for dynamo-electric machines, and it has special reference to systems that are adapted to automatically govern the operation of an electrically propelled vehicle through the agency of an electro-responsive relay or limit switch.

One of the objects of my invention is to provide a control system of the character indicated which shall be adapted to maintain a definite and uniform rate of acceleration independent of the load upon the vehicle.

More specifically, it is the object of my invention to provide means for automatically adjusting the setting and, therefore, the action of the limit switch in accordance with load conditions upon the vehicle, and, moreover, to effect such adjustments only when the vehicle is at standstill.

When automatic motor-control systems have been employed for governing the acceleration of electrically propelled vehicles, it has been customary to adjust the setting of the limit switch to effect the desired rate of acceleration under normal load conditions. It is evident, however, that electric vehicles such as motor cars or trains of motor cars are subjected to varying loads in accordance with the amount of traffic which is handled during different times of the day. With the type of automatic control system heretofore employed, the rate of acceleration is materially decreased during rush hours when the traffic is congested and the cars crowded, while, during other portions of the day when the traffic is light, the rate of acceleration is correspondingly increased, by reason of the fact that the rate of acceleration varies inversely with the load, so long as the accelerating force is constant.

According to my present invention, I propose to provide means for maintaining a substantially constant rate of acceleration at all times independently of load conditions, and, to attain this end, I provide means for adjusting the setting of the limit switch in accordance with the load through the agency of an auxiliary mechanism which may conveniently be interposed between the trucks of the vehicle and the spring-borne body and which serves to regulate or adjust the limit switch in accordance with relative positions of the car body and trucks and, therefore, in accordance with the number of passengers or the load upon the vehicle.

In order that the setting of the limit switch and the adjusting mechanism shall not be changed during the operation of the vehicle, as would be the case if these devices were permitted to be subjected to the vibrations incident to the irregularities of the track, under operating conditions, I provide means for rendering the adjusting mechanism inoperative except when the car door or some other device which is actuated only when the vehicle is at rest, is operated.

The single figure of the accompanying drawing is a view, partially in elevation and partially in diagrammatic form, of an electrically propelled vehicle provided with a control system embodying my invention.

Referring to the drawing, the apparatus shown comprises a vehicle or car 1 that is propelled by a plurality of electric motors $M^1$ and $M^2$ which are automatically governed through the operation of a control system 2 embodying an electro-responsive relay or limit switch 3, in accordance with well-known practice. The action of the limit switch 3 is rendered dependent upon the load upon the vehicle 1 through the agency of rheostatic regulating apparatus 4 that is actuated by means of an adjusting mechanism 5 in accordance with load conditions, although other suitable means may be employed for this purpose.

The vehicle 1 comprises a plurality of trucks 8 (only one of which is shown) and a spring-borne body 9 supported thereon in a well-known manner. Each truck 8 embodies a plurality of wheels $9^a$, journal boxes 10, an equalizing structure 11 that rests directly upon the journal boxes and which serves to resiliently support a relatively movable member 12 by means of a plurality of springs 13. The movable member 12 is pivotally associated with the car body 9 by means of a center pin (not shown) or other suitable means, and said member 12, 11 moreover, serves to resiliently carry a portion of the weight of the car body 9 and passengers.

Projecting between, and rigidly supported by, the respective side members of the equalizer structure 11 is a member or plate 15 which is adapted to be engaged by a movable member 16 that is carried between a plurality of guide members 17 forming parts of a supporting bracket 18, the latter being rigidly secured to the car body 9. The member 16 is provided with a inclined upper surface 19 and is adapted to be raised and lowered in position with respect to the body 9 in accordance with the relative movements between said spring-borne body and the rigid equalizer structure 11 of the truck. It is evident, therefore, that, when the car 1 is heavily loaded, the body 9 depresses the supporting springs 13 and the inclined movable member 16 is forced upwardly with respect to the car body 9 by reason of its engagement with the member 15.

The motors $M^1$ and $M^2$ may be of any construction familiar in the art and both may be disposed upon a single truck or one may be carried by each truck.

The automatic control system 2 embodies a manually operated master controller MC for the purpose of governing the operation of a plurality of electrically actuated switches LS, $R^1$, $R^2$, and $R^3$, the switch LS constituting a line switch in circuit with the motors $M^1$ and $M^2$ and a supply circuit or trolley 25, while the switches $R^1$, $R^2$ and $R^3$ are adapted to short circuit a plurality of accelerating resistors, which, for purposes of simplification, may be designated by the same reference characters. In series circuit with motors $M^1$ and $M^2$ and the resistors $R^1$, $R^2$ and $R^3$, or, at least, in a circuit influenced by the motor current, is a main energizing coil 26 of the electro-responsive relay or limit switch 3. The limit switch 3 embodies a plurality of relatively movable switch members 27 and 28 and operates, in a manner familiar to those skilled in the art, in accordance with the amount of current traversing the motor circuit to automatically make and break an auxiliary control circuit 29 which is interlocked through its coöperating switch members. Without describing further the motor connections and mode of operation of the control system 2, it will be understood that the system is merely illustrative of any type of system for automatically controlling the acceleration of the driving motors $M^1$ and $M^2$ in accordance with the action of a limit switch.

For purposes of regulating the setting and action of the limit switch 3, an auxiliary shunt coil 30 is provided therefor and said coil is adapted to be energized from an auxiliary source of energy or battery B in a direction to oppose the action of its main coil 26. The degree of energization of the coil 30 or the strength of its opposing action is dependent upon the adjustment of the rheostatic regulating device 4 which comprises a plurality of resistor sections 33 having taps connected to stationary contact terminals 34, 35, 36, 37 and 38 and a movable switch member 39 that is adapted to coöperatively engage said terminals and to bridge a circuit between any one of said terminals and a conducting segment 40 which is connected to one terminal of the battery B.

In the position shown, the auxiliary coil 30 of the limit switch 3 is ineffective, inasmuch as no engagement is made by the switch member 39 between the segment 40 and any of the terminals 34 to 38, inclusive. If the switch member 39 be moved into a position to bridge the circuit between contact terminal 34 and the segment 40, the battery B is adapted to furnish energy to the auxiliary coil 30, although the strength thereof is relatively small, inasmuch as all of the resistor sections 33 are included in series therewith. However, as switch member 39 is moved to the right to successively exclude the various resistor sections 33, the energization of the coil 30 of the limit switch 3 is correspondingly increased. Hence, the action of the limit switch 3 is materially modified, it being understood that, by reason of the opposing action of the coil 30, the limit switch will drop to recomplete the control circuit 29 at an increased motor current traversing the coil 26, and, therefore, the automatic progression of the resistor switches will be effected at a higher average motor current.

The adjustments of the rheostatic regulating device 4 which have just been described, are effected through the agency of the adjusting mechanism 5 which is disposed between the spring-borne body 9 of the vehicle 1 and one of its trucks 8. The mechanism 5 comprises an actuating lever 45 which is pivoted intermediate its ends, its lower end being provided with a roller 46 which is adapted to engage the inclined surface 19 of the movable member 16. The upper end of the lever 45 being pivotally connected to an actuating rod 47 that is biased to one of its positions by a spring 48 that surrounds the rod and is disposed between a collar 49 secured thereto and stationary member 50 associated with the body 9.

The rod 47 is adapted to be operatively connected to another actuating rod 53 by means of a collapsible toggle 54 comprising a plurality of links 55 and 56 that are pivotally connected together by a pin 51 and the opposite ends of which have pin-and-slot connections 57 and 58 with the adjacent ends of the respective rods 47 and 53. The toggle 54 is normally maintained in an inoperative position, as shown in the figure, and, by reason thereof, the longitudinal movements of the rod 47 cannot be transmitted to the rod 53. The rod 53 is pivotally connected to one end of an operating lever 45ª which is pivotally supported intermediate its ends, and the other end of which is connected to a rod 52 that is associated with the movable switch member 39. A spring 48ª surrounds the rod 52 for the purpose of biasing the switch member 39 and the associated rods and lever to an initial position.

In order to render the adjusting mechanism 5 operative, a cylinder 60 is provided which contains a movable piston 61 that is associated with a rod 62, the lower end of which is provided with a slotted cross-head 63 through which projects the pin 51 that connects the links 55 and 56 together. The piston 61 is normally maintained in its lower position, as shown, by means of an operating fluid, such as compressed air, which is admitted into the cylinder 60 and which acts in opposition to a spring 66.

The admission and release of operating fluid to the cylinder 60 is governed by a valve 67 which is adapted for manual operation and is preferably located near the master controller MC where it may be conveniently manipulated by the motorman or operator. The valve 67 is also adapted to govern the admission and release of operating fluid to a cylinder 70 that contains a movable piston 71 having a mechanical connection 72 to a sliding door 73 with which the car 1 is provided. A spring 74 coöperates with the piston 71 and normally tends to open the door 73, except when operating fluid is admitted to the cylinder 70. As the specific structural details of the valve 67 are not of material importance to my present invention, any form of valve may be employed that is adapted to govern the admission and release of operating fluid to and from the cylinders 60 and 70.

A locking device 78 is provided for restraining the switch member 39 and its associated rods and levers 52, 45ª and 53 in their adjusted positions, and said locking device 78 comprises a pivotally mounted lever 79 that carries a pawl 80, the latter being adapted to coöperatively engage a plurality of teeth 81 with which the rod 53 is provided. A spring 82 is interposed between the lever 79 and a lug 83 for the purpose of maintaining the pawl 80 in engagement with the teeth 81. The free end 85 of the lever 79 is disposed in such position that it is engaged by the link 56 when the toggle 54 is raised into its operative position in order to release the pawl 80 and permit of the adjustment of the switch member 39. As soon as the toggle 54 is dropped, the pawl 80 is again forced downwardly by means of the spring 82 and thus locks the switch member 39 against further movement.

Assuming the car 1 to be empty and about to be started into operation from standstill, the circuit connections and the various parts of the apparatus occupy the positions shown in the drawing. The master controller MC is first moved to one of its operative positions to establish the circuit connections for effecting an automatic acceleration of the motors $M^1$ and $M^2$ at a given rate in accordance with the action of the limit switch 3.

Under the assumed unloaded conditions, the limit switch 3 depends for its action entirely upon the current traversing its main series coil 26, inasmuch as the auxiliary coil 30 is not energized from the battery B.

When the car is brought to a stop to receive passengers, the control valve 67 is operated to permit the release of operating fluid from the cylinders 70 and 60, thereby permitting the opening of the door 73 and causing the toggle 54 to be raised into an operative position in which its links 55 and 56 are brought into alinement with the actuating rods 47 and 53, thereby establishing a rigid operative connection between the rods 47 and 53. As hereinbefore set forth, the pawl 80 is disengaged from the teeth 81 to release the rod 53 and permit of free adjustments of the switch member 39.

If a large number of passengers board the car, the additional weight imposed upon the springs 13 causes the body 9 of the car to be lowered slightly and a relative movement to occur between the movable inclined member 16 and the lever 45 carrying the roller 46. Thus, the lever 45 is forced in a counter-clockwise direction, whereby its movement is transmitted to the switch member 39 through the rod 47, links 55 and 56, rod 53, lever 45ª and rod 52. The switch member 39 is, therefore, moved to the right to make contact with one of the contact terminals 34 to 38, inclusive, dependent upon the load upon the vehicle.

If the switch member 39 is thus adjusted to bridge the contact members 36 and 40, for instance, a circuit is completed from the battery B through the auxiliary coil 30 of the limit switch 3 and, thence, through the upper resistor sections 33 and coöperating switch members 36, 39 and 40 to the battery. Upon the completion of this circuit, energy is supplied to the auxiliary coil 30, and, since the influence of this coil is opposed to the normal action of the main coil 26, it is evident that, having been raised to break the control circuit 29, the limit switch is dropped to reëstablish the automatic progression at higher average motor current. The setting of the limit switch, therefore, is automatically regulated in accordance with the load upon the vehicle, and, by properly proportioning the various parts, the limit switch may be adjusted to maintain a substantially uniform rate of acceleration under all conditions of load.

The adjustments referred to, being effected while the car is at rest and the door 73 open, the valve 67 is manipulated to admit operating fluid to the cylinders 70 and 60, whence the door 73 is closed and the piston 61 moved downwardly to collapse the toggle 54 and permit the spring operated pawl 80 to engage the teeth 81 and lock the movable switch member 39 in its adjusted position. Any vibration or vertical movements of the car body 9 relative to the truck 8, which might be caused by irregularities in the track, therefore, only serve to rock the lever 45 and associated rod 47 to and fro without effecting in any way the adjustment and operation of the limit switch 3.

If, on the next stop, passengers are discharged and the load upon the car thus lessened, the spring 48$^a$ which surrounds the actuating rod 52, tends to move the switch member 39 to the left until it occupies a position which is determined by the relative positions of the movable inclined member 16 and coöperating lever 45. Thus, additional resistor sections 33 are cut into the local energizing circuit of the auxiliary coil 30 and, therefore, its opposing influence is correspondingly lessened, whence, the permissible accelerating current is decreased in proportion.

The regulation of the action of the limit switch 3, therefore, is rendered dependent upon the load carried by the car, and, consequently, a substantially constant rate of acceleration is maintained under all load conditions.

Although I have shown and described my invention as embodying specific structural details and arrangement and location of parts and circuit connections, many modifications therein may be effected without departing from the spirit and scope of my invention, and I desire that only such limitations shall be imposed as are indicated in the appended claims:

I claim as my invention:

1. In a control system for vehicle motors, the combination with a vehicle, an electric motor for propelling the vehicle, and an automatic control system for governing the acceleration of the motor, of automatic means for regulating the operation of the control system, and a fluid device for permitting the setting of said automatic means in accordance with different loads carried by the vehicle when the same is at rest.

2. In a control system for vehicle motors, the combination with a vehicle, an electric motor for propelling the vehicle, and an automatic control system for governing the acceleration of the motor, of means mechanically controlled by the load carried by the vehicle for regulating the operation of the control system.

3. In a control system for vehicle motors, the combination with a vehicle, an electric motor for propelling the vehicle, and an automatic control system for governing the acceleration of the motor, of automatic means for regulating the flow of the motor current and the rate of acceleration in accordance with the load upon the vehicle, and a fluid device for governing the operation of said automatic means under predetermined conditions.

4. In a control system for vehicle motors, the combination with a vehicle, an electric motor for propelling the vehicle, and an automatic control system for governing the acceleration of the motor, of automatic means mechanically controlled by the load mounted on the vehicle for automatically regulating the operation of said control system.

5. In a control system for vehicle motors, the combination with a vehicle, an electric motor for propelling the vehicle, and an automatic control system embodying an electro-responsive device for governing the acceleration of the motor, of automatic means for regulating the operation of said electro-responsive device in accordance with the load upon the vehicle and a fluid device for permitting the setting of said automatic means under predetermined conditions.

6. In a control system for vehicle motors, the combination with a vehicle, an electric motor for propelling the vehicle, and an automatic control system embodying an electro-responsive device for governing the acceleration of the motor, of auxiliary means for influencing the action of said electro-responsive device, and automatic means mechanically controlled for regulating the operation of said auxiliary means in accordance with the load upon the vehicle.

7. In a control system for vehicle motors, the combination with a vehicle, an electric motor for propelling the vehicle, and an automatic control system embodying an electro-responsive device for governing the acceleration of the motor, of an auxiliary coil associated with said electro-responsive device, a source of energy for energizing said coil, and automatic means for regulating the action of said auxiliary coil.

8. In a control system for vehicle motors, the combination with a vehicle, an electric motor for propelling the vehicle, a system of control for governing the operation of said motor, and an automatic limit switch having a main coil traversed by the motor current, of an auxiliary coil associated with said switch and acting in opposition to the main coil thereof, and automatic means for regulating the amount of current flowing through the auxiliary coil in accordance with the load upon the vehicle.

9. In a control system for vehicle motors, the combination with a vehicle, an electric motor for propelling the vehicle, a system of control for governing the operation of said motor, and an adjustable limit switch traversed by the motor current for effecting an automatic and uniform rate of acceleration of said motor, of automatic means for adjusting the setting of said limit switch in accordance with variations in the live load upon the vehicle, whereby a constant rate of acceleration is maintained irrespective of changes of load.

10. In a control system, the combination with a vehicle comprising a truck and a spring-borne body, an electric motor for propelling the vehicle, and a control system for governing the operation of said motor, of means interposed between said body and said truck for influencing the action of the control system in accordance with relative movements between said body and said truck.

11. In a control system, the combination with a vehicle comprising a truck and a spring-borne body, an electric motor for propelling the vehicle, and an automatic control system for governing the operation of said motor, of means for regulating the action of said control system, and mechanical means interposed between said body and said truck for actuating said regulating means in accordance with variations in the load upon said vehicle.

12. In a control system for electrically propelled vehicles, the combination with a vehicle, an electric motor therefor, and an automatic control system for governing the acceleration of said motor, of means mechanically and automatically operated in accordance with the load upon the vehicle for regulating the action of said system.

13. In a control system for electrically propelled vehicles, the combination with a vehicle, an electric motor therefor, and an automatic control system for governing the acceleration of said motor, of means operative only when said vehicle is at rest for regulating the rate of acceleration of said motor in accordance with variations in the load of said vehicle.

14. In a control system for electrically propelled vehicles, the combination with a vehicle, an electric motor therefor, and an automatic control system for governing the acceleration of said motor, of a fluid-operated device for said vehicle, and means dependent upon the position of said device for regulating the automatic operation of said control system in accordance with the load upon said vehicle.

15. In a control system for electrically propelled vehicles, the combination with a vehicle, an electric motor therefor, and an automatic control system for governing the acceleration of said motor, of automatic means for influencing the operation of said control system in accordance with the load upon the vehicle, and a fluid device for governing the operation of said automatic means under predetermined conditions.

16. In a control system for electrically propelled vehicles, the combination with a vehicle, an electric motor therefor, and an automatic control system for governing the acceleration of said motor, of adjustable means for regulating the operation of said automatic control system in accordance with the load upon the vehicle, means for rendering said regulating means operative only under predetermined conditions, and means for maintaining said regulating means in its adjusted position.

17. In a control system for electrically propelled vehicles, the combination with a motor, and a circuit therefor, of automatic means mechanically controlled for regulating the flow of current in said circuit in accordance with the load mounted on the vehicle.

18. In a control system for electrically propelled vehicles, the combination with an electric driving motor, of automatic means mechanically controlled by the load carried by the vehicle for governing the operation of said motor and maintaining a constant rate of acceleration under all conditions of load.

19. In a control system for electrically propelled vehicles, the combination with an electric motor, a control circuit therefor, and a limit switch for governing said control circuit, of automatic means mechanically controlled for regulating the action of said limit switch in accordance with the load mounted on the vehicle.

20. In a control system for an electric vehicle, the combination with a plurality of propelling motors and a limit switch for controlling the acceleration of the motors, said limit switch having two differentially wound coils for operating it, of automatic means controlled by the load upon the vehicle for governing the energization of one of said coils.

21. In a control system for an electric vehicle, the combination with a plurality of propelling motors and a limit switch for controlling the acceleration of the motors, said limit switch having two differentially wound coils for operating it, of means mechanically controlled by the load carried by the vehicle for governing the energization of one of said coils.

22. In a control system for an electric vehicle, the combination with a plurality of propelling motors, and a limit switch for controlling the acceleration of said motors, said limit switch having two differentially wound coils for operating it, of automatic means mechanically controlled by the load upon the vehicle for governing the energization of one of said coils.

23. In a control system for an electric vehicle, the combination with a plurality of propelling motors, a circuit including said motors, an auxiliary circuit associated with said motor circuit, and a limit switch for controlling the acceleration of said motors and having two differentially wound coils, one of said coils is included in the motor circuit and the other coil is included in the auxiliary circuit, of automatic means for varying the energization of the coil included in the auxiliary circuit in accordance with the load carried by the vehicle.

In testimony whereof, I have hereunto subscribed my name this 29th day of December 1914.

FRANCIS H. SHEPARD.

Witnesses:
  WM. H. CAPEL,
  C. WESLEY POMEROY.